(12) United States Patent
Chopra et al.

(10) Patent No.: US 9,760,445 B1
(45) Date of Patent: Sep. 12, 2017

(54) DATA PROTECTION USING CHANGE-BASED MEASUREMENTS IN BLOCK-BASED BACKUP

(71) Applicant: EMC IP Holding Company LLC, Hopkinton, MA (US)

(72) Inventors: Shelesh Chopra, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 14/297,475

(22) Filed: Jun. 5, 2014

(51) Int. Cl.
*G06F 12/02* (2006.01)
*G06F 11/14* (2006.01)

(52) U.S. Cl.
CPC ................ *G06F 11/1451* (2013.01)

(58) Field of Classification Search
CPC ...... G06F 3/0619; G06F 3/064; G06F 3/0643; G06F 11/1446; G06F 11/1448; G06F 11/1451; G06F 11/1458; G06F 11/1461; G06F 2212/1032
USPC .................................................. 711/161, 162
See application file for complete search history.

(56) References Cited

U.S. PATENT DOCUMENTS

| | | | |
|---|---|---|---|
| 7,330,997 B1 | 2/2008 | Odom | |
| 7,356,727 B1 | 4/2008 | McGhee et al. | |
| 7,672,979 B1 | 3/2010 | Appellof | |
| 8,429,359 B1 * | 4/2013 | Desai | G06F 12/16 711/162 |
| 2006/0218363 A1 * | 9/2006 | Palapudi | G06F 11/1451 711/162 |
| 2010/0070475 A1 * | 3/2010 | Chen | G06F 11/1461 707/640 |
| 2011/0218967 A1 | 9/2011 | Sliger et al. | |

OTHER PUBLICATIONS

Author Unknown, VMware KB: Changed Block Tracking (CBT) on Virtual Machines, http://kb.vmware.com/selfservice/microsites/search.do?language=en_US&cmd=displayKC&externalId=1020128, Nov. 21, 2013.

* cited by examiner

*Primary Examiner* — Gary Portka
(74) *Attorney, Agent, or Firm* — Van Pelt, Yi & James LLP

(57) ABSTRACT

Data protection using change-based measurements in block-based backup is disclosed. Block change information indicating an extent of change associated with a volume may be determined. The block change information may be based at least in part on stored information indicating monitored changes to blocks in the volume. A backup operation may be initiated based at least in part on the determined block change information.

26 Claims, 6 Drawing Sheets

DATA PROTECTION USING CHANGE-BASED MEASUREMENTS IN BLOCK-BASED BACKUP

BACKGROUND OF THE INVENTION

Traditional file system backup approaches may use a file system walk to enumerate the files and then read and transfer each file as needed to backup storage. Incremental backup operations reduce overhead associated with the file system walk by only processing files created and/or modified since a last backup operation. Further increases in backup efficiency have been achieved using synthetic full backup approaches which create synthetic full backups by combining previous full backups with incremental changes. In certain cases, backup operations can be triggered manually and given a specific file list to process thereby avoiding the file system walk, but that list still has to be generated externally.

Block-based approaches eliminate the need for a file system walk by tracking block-level changes to a volume. Stored data representing the block-level changes may be used to identify and backup the changed blocks in an incremental backup operation. Since data identifying changed blocks on the volume is ready at any point in time, there is no need for additional operations to generate a list of what blocks need to be saved. Block-based backup operations are typically scheduled using a central backup server (e.g., using scheduler built in to backup server software), scheduled manually using third-party schedulers, and/or initiated manually (e.g., by an end user). In each case, the recovery point objective (RPO) may be based on a predetermined schedule and user intervention.

BRIEF DESCRIPTION OF THE DRAWINGS

Various embodiments of the invention are disclosed in the following detailed description and the accompanying drawings.

DETAILED DESCRIPTION

Figure 1:
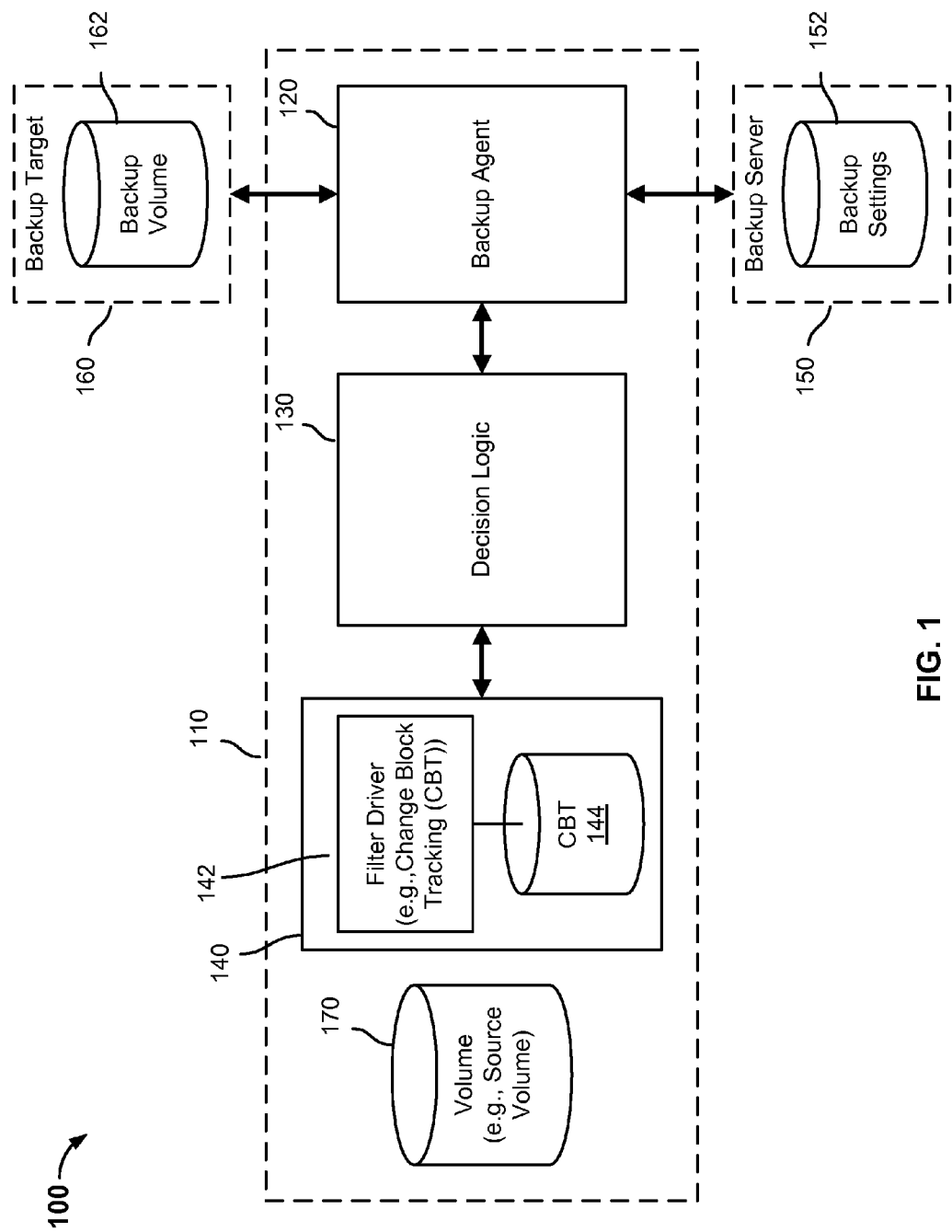
FIG. 1 is a block diagram illustrating an embodiment of a system to protect data using block-based backup.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data protection using change-based measurements in block-based backup is disclosed. In various embodiments, block change information indicating an extent of change associated with a volume is determined. The block change information is based at least in part on stored information indicating monitored changes to blocks in the volume. A backup operation is initiated based at least in part on the determined block change information.

In various embodiments, the techniques disclosed herein reduce the likelihood of data loss in backup-configured storage systems while optimizing consumption of backup resources. Backup operations are triggered dynamically based on usage of storage volume as indicated by, for example, a monitored number of blocks changed, percentage of blocks changed, and/or other indicia. Utilizing these approaches, backup operations are performed as necessary to preserve data on the volume rather than according a set schedule that may or may not correspond with use of the volume. For example, systems that are often idle may consume less backup resources, and backup operations will be triggered less frequently. While active systems may be backed up more frequently. In certain cases, the value of a backup operation (e.g., in protecting data, reducing the likelihood of lost data, etc.) may be proportional the change rate associated with a system. And using the approaches herein the recovery point objective (RPO) may be keyed to the value of the backup operation as indicated by change to blocks in the volume.

FIG. 1 is a block diagram illustrating an embodiment of a system to protect data using block-based backup. In the example shown, a system for data protection using block-based backup 100 may include a computing device 110 (e.g., client device), backup agent 120, decision logic 130, change block tracking (CBT) engine 140, backup server 150, backup target 160, and/or other components. The computing device 110 (e.g., client device, source device) may include a desktop computer, server, mobile device, and/or any other computing device. The computing device 110 may include a processor (e.g., a central processing unit (CPU)), random access memory (RAM), and/or a volume 170 (e.g., source volume, data storage volume, disk(s), hard-disk drive(s) (HDD) (e.g., the F:\ drive), solid-state drive(s) (SSD), partition(s), virtual disk(s), etc.). A change block tracking (CBT) engine 140 may include a CBT driver 142 (e.g., file system filter driver, a change block tracking (CBT) driver, etc.), CBT database 144, and/or other components. The CBT driver 142 may, for example, include a file system filter driver configured with change block tracking capabilities (e.g., configured to execute CBT algorithms). The CBT driver 142 may track/monitor changes to the volume 170 (e.g., changed blocks in the volume 170). The CBT driver 142 may, for example, monitor/track changes to blocks in the volume 170 continuously (e.g., in real time), at intervals (e.g., every 10 seconds, five (5) minutes, etc.), and/or in any other manner. The CBT driver 142 may store information indicating monitored changes to blocks in the volume 170 a CBT database 144. The information indicating monitored changes to blocks in the volume may, for example, be stored as a bitmap, in a table, data arrangement, data schema, and/or other data structure in the CBT database 144. For example, the data structure may include tracked information indicating monitored changes to blocks in a volume that is collected over a period of time (e.g., since a last backup, over a user-defined period, since installation, etc.). In some embodiments, the data structure may be reset (e.g., cleared, erased, archived) upon the occurrence of certain events including, for example, backup operations, data restore operations, and/or other data protection operations executed on the volume 170.

In various embodiments (not shown), the CBT engine 140 and/or components thereof may be located on a switch and/or other node. For example, the system 100 may include an intelligent switch (e.g., between a client device 110 and backup target 160), and the intelligent switch may include change block tracking functionality.

In various embodiments, the backup agent 120 (e.g., backup client) is included on (e.g., software installed on) the computing device 110. The backup agent 120 may communicate with the CBT engine 140, backup server 150, backup target 160, and/or other components to facilitate/manage the execution of backup and/or restore operations of data (e.g., data blocks) stored in the source volume 170. For example, the backup agent 120 may receive and/or execute work orders (e.g., data backup orders, data restore orders, etc.) from the backup server 150, backup target 160, decision logic 130, and/or other nodes.

According to various embodiments, the decision logic 130 may determine the occurrence of backup-trigger events and/or initiate backup operations using the approaches discussed herein. The decision logic 130 may, for example, persist information regarding previous backup operations (e.g., the last backup), monitor the stored information indicating monitored changes to blocks in the volume, and initiate backup operations based on the occurrence of backup trigger events. In various embodiments, the decision logic 130 may be associated with the backup agent 120 (e.g., a functionality of the backup agent 120), may be a stand-alone module on the client device 110, and/or may be otherwise associated with the client device. In some embodiments, the decision logic 130 may be associated with (e.g., located at) another node including, for example, the backup server 150, backup target 160, a switch (not shown), and/or other node.

In various embodiments, the decision logic 130 may retrieve (e.g., pull) stored information indicated changes to blocks in the volume 170 from the CBT engine 140. For example, the decision logic 130 may query the CBT database 144 (e.g., a block change information data structure) to retrieve block change information. In some embodiments, the block change information may be provided (e.g., pushed) to the decision logic 130 from the CBT engine 140. For example, the CBT engine 140 may periodically provide block change information to the decision logic 130. In another example, the CBT engine 140 may provide block change information to the decision logic 130 based on the occurrence of an event (e.g., significant change (e.g., a percentage/number) of changes to blocks in the volume).

In various embodiments, decision logic 130 may determine block change information based on information indicating monitored/tracked changes to blocks in the volume 170. The block change information may indicate an extent of change associated with blocks in the volume 170 (e.g., a number of blocks changed, a number of blocks changed over a period of time, a percentage change, etc.). The block change information may be compared to a threshold (e.g., a user-defined threshold, automatically-determined threshold, etc.), and in the event the block change information exceeds the threshold it may be determined that a backup-trigger event has occurred. Upon occurrence of a backup trigger event, a backup operation (e.g., incremental backup, full backup, etc.) of the volume 170 may be initiated. For example, the decision logic may invoke/command the backup agent 120 to initiate backup of the source volume 170 to a backup target 160.

According to various embodiments, the backup agent 120 may communicate with a backup server 150 to perform backup operations. The backup server 130 may be associated with a backup settings repository 152 (e.g., backup parameters repository). The backup settings repository 152 may include backup records (e.g., block map(s), block offset information, etc.), configuration information, backup schedule information (e.g., scheduled full backups, incremental backups), backup-trigger threshold information (e.g., a threshold number of changed blocks, percentage of changed blocks, etc.), backup-trigger rules, and/or other backup-related information. In various embodiments, the backup server 150 may receive backup trigger threshold information, backup-trigger rules, and/or other backup settings (e.g., from a user, administrator, other node). The backup server 150 may provide the backup trigger threshold information, backup-trigger rules, and/or other backup settings to the decision logic 130 (e.g., via the backup agent 120).

In some embodiments, the backup server 150 may coordinate backup operations in conjunction with the backup agent 120. The backup server 150 may, for example, initiate scheduled backups, trigger-event based backups, and/or other operations by providing commands to the backup agent 120. In a backup operation, the backup agent 120 may facilitate copy/transfer of data (e.g., blocks) from the source volume 170 to a backup target 160. During a backup operation data blocks may be transferred/copied from the volume 170 (e.g., the source volume) to the backup target 160 for storage in a backup volume 162 (e.g., replica volume, virtual hard disk (VHD), tape, etc.). The backup volume 162 includes a set of backups of the associated source volume 170. The backup volume 162 may, for example, include set(s) of full backup data, incremental backup data, virtual synthetic backup data, and/or other backup data.

According to some embodiments, in conjunction with a backup operation, information regarding the data (e.g., blocks) transferred/copied from the source volume 170 to the backup volume 162 may be stored at the backup server 150. For example, the backup server 150 may store a map of blocks included in each of one or more backup(s) (e.g., full backups and/or incremental backups). The backup server 150 may keep track of offsets (e.g., block offsets) and backup data on the backup volume 162 and source volume 170. In some embodiments, as part of a backup operation, a mapping of the offsets on the source volume 170 and the backup volume 162 may be generated. A mapping of blocks stored on the source volume 170 to corresponding blocks (e.g., backup blocks, replica blocks) on the backup volume 162 may be stored at the backup server 150. This mapping of blocks in the source volume 170 to blocks in the backup volume 162 may also be stored/replicated at the computing device (e.g., the client). The mapping of blocks on the source volume 170 to corresponding blocks on the backup volume 162 may be used in backup operations and/or restore operations (e.g., to restore backup data from the backup volume 162 to the source volume 170).

Figure 2:
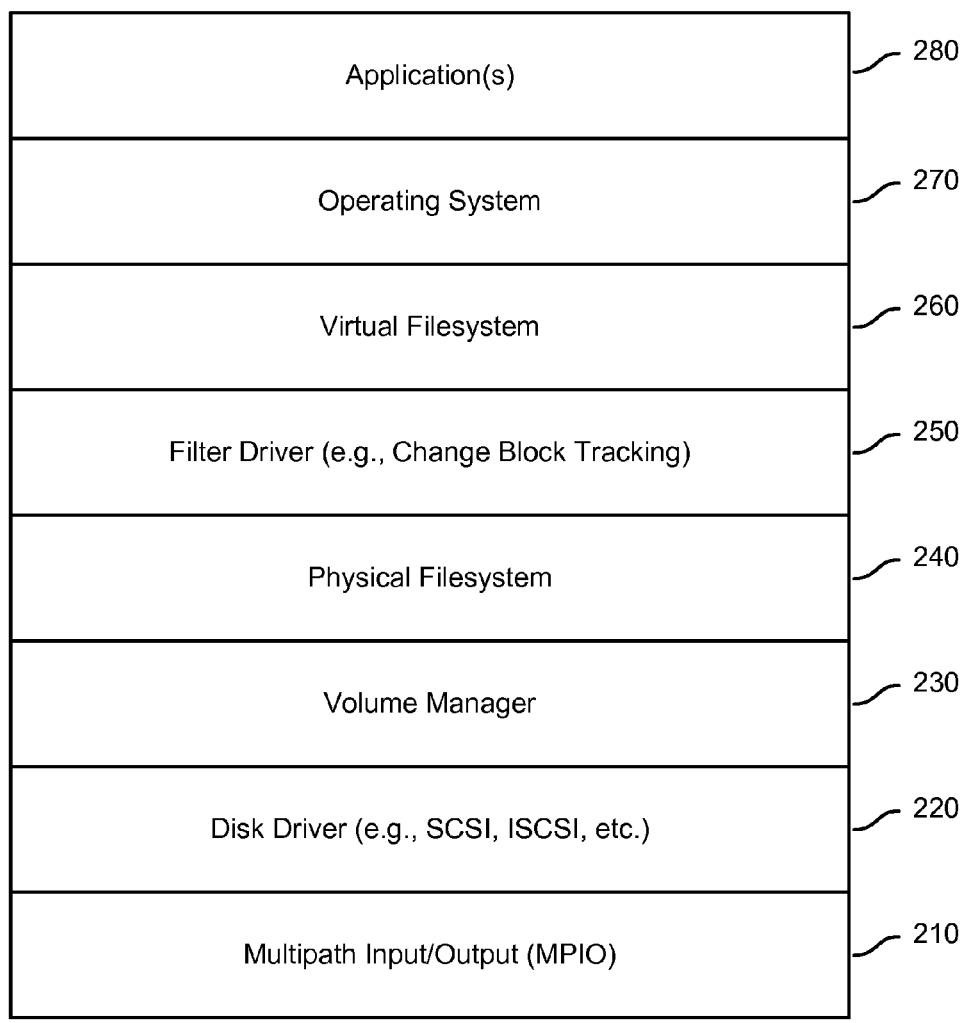
FIG. 2 is block diagram illustrating an embodiment of an operating system including change block tracking functionality.

FIG. 2 is block diagram illustrating an embodiment of an operating system including change block tracking functionality. In the example shown, an operating system (OS) stack 200 is depicted. The OS stack 200 may include, for example, a multipath input/output (MPIO) layer 210, disk driver(s) 220 (e.g., Small Computer System Interface (SCSI), Internet Small Computer System Interface (ISCSI), etc.), a volume manager 230, physical file system 240, filter driver 250 (e.g., file system filter driver, change block tracking (CBT) driver), virtual file system 260, operating system 270, and/or an application layer 280. In various embodiments, the filter driver 250 may include functionality (e.g., algorithms) which enable it to intercept and/or track writes to a data on a physical file system 240 (e.g., source volume) with change block tracking. The monitored/tracked writes to data may be stored as information indicating monitored changes to blocks in the volume in, for example, a change block tracking repository (e.g., CBT repository 144 of FIG. 1) associated with the filter driver 250. In some embodiments (not shown), the filter driver 250 may be situated between a physical file system 240 and a disk driver 220.

Figure 3:
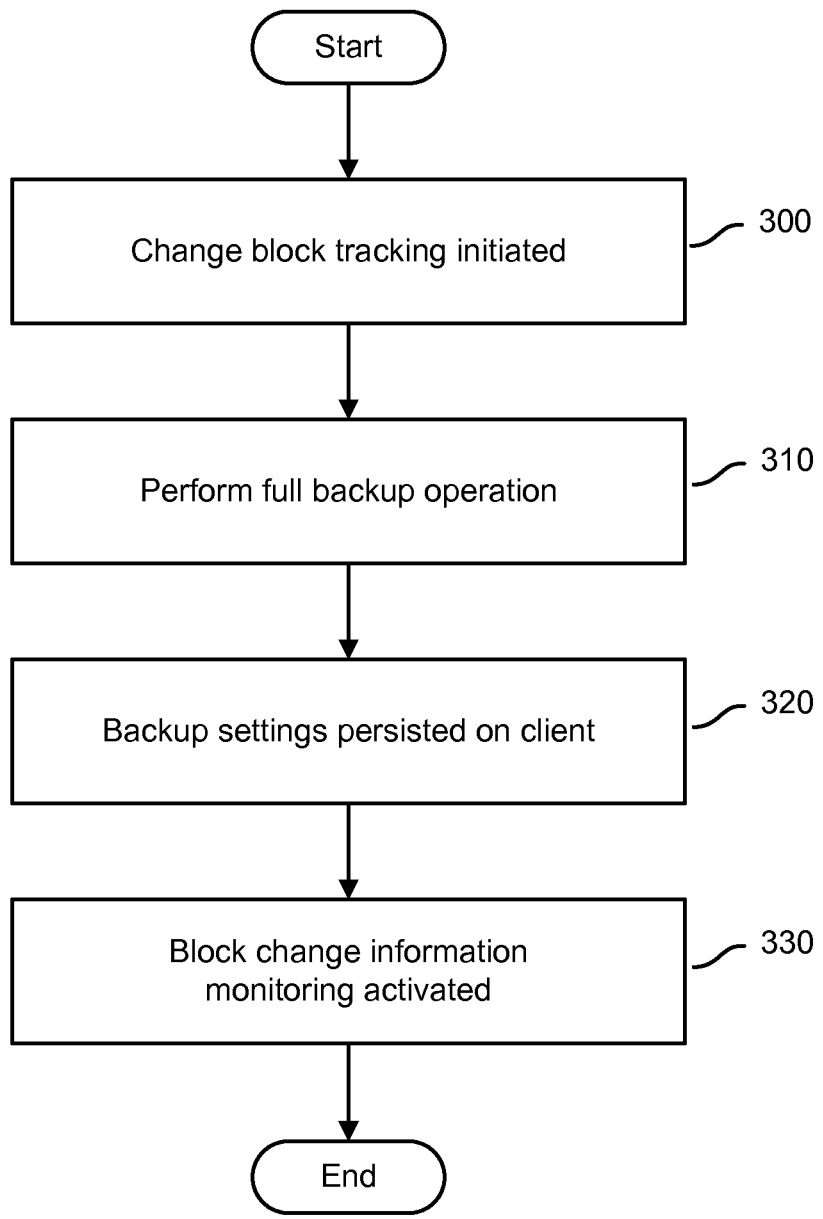
FIG. 3 is a flow chart illustrating an embodiment of a process of initiating block change monitoring.

FIG. 3 is a flow chart illustrating an embodiment of a process of initiating block change monitoring. At 300, change block tracking may be initiated. In various embodiments, change block tracking/monitoring may be initiated on a client device by activating a CBT filter driver. Upon activation, the CBT filter driver may be configured to monitor/track changes to blocks in a source volume and store information indicating the monitored changes in a CBT database.

At 310, a full backup operation may be performed. In various embodiments, an initial full backup operation may be performed to initiate a data backup system (e.g., system 100 of FIG. 1). The system may be initiated by copying a full image of the source volume to the backup target. In some embodiments, a decision logic and/or backup agent associated with the source volume may persist information associated with the full backup. For example, information indicating the state of the source volume at the time of backup may be persisted. This information may include a mapping of blocks (e.g., a bitmap representation, table, data structure, etc.) on the volume at the time of full backup.

At 320, backup settings are persisted on the client computing device. In various embodiments, backup settings/parameters defined, for example, at a backup server may be provided to the backup agent and/or decision logic. The backup settings may include information regarding scheduled backup operations (e.g., times associated with scheduled backups), backup configuration information (e.g., backup target(s) to which data is be backed up/copied), and/or other backup settings. The backup settings may include, for example, backup-trigger event threshold(s), backup-trigger rules, and/or other information used to determine the occurrence of backup-trigger events. The backup settings may include, for example, information defining how often (e.g., intervals, continuously) the decision logic should monitor for (e.g., check for) the occurrence of a backup-trigger event. This information may dictate how often the decision logic queries the CBT engine for information indicating monitored changes to blocks in the volume information.

At 330, backup change information monitoring is activated. In various embodiments, the decision logic and/or backup agent are configured to determine block change information associated with the source volume. For example, the decision logic may periodically and/or continuously (e.g., as defined by the backup settings) determine block change information associated with the source volume.

Figure 4A:
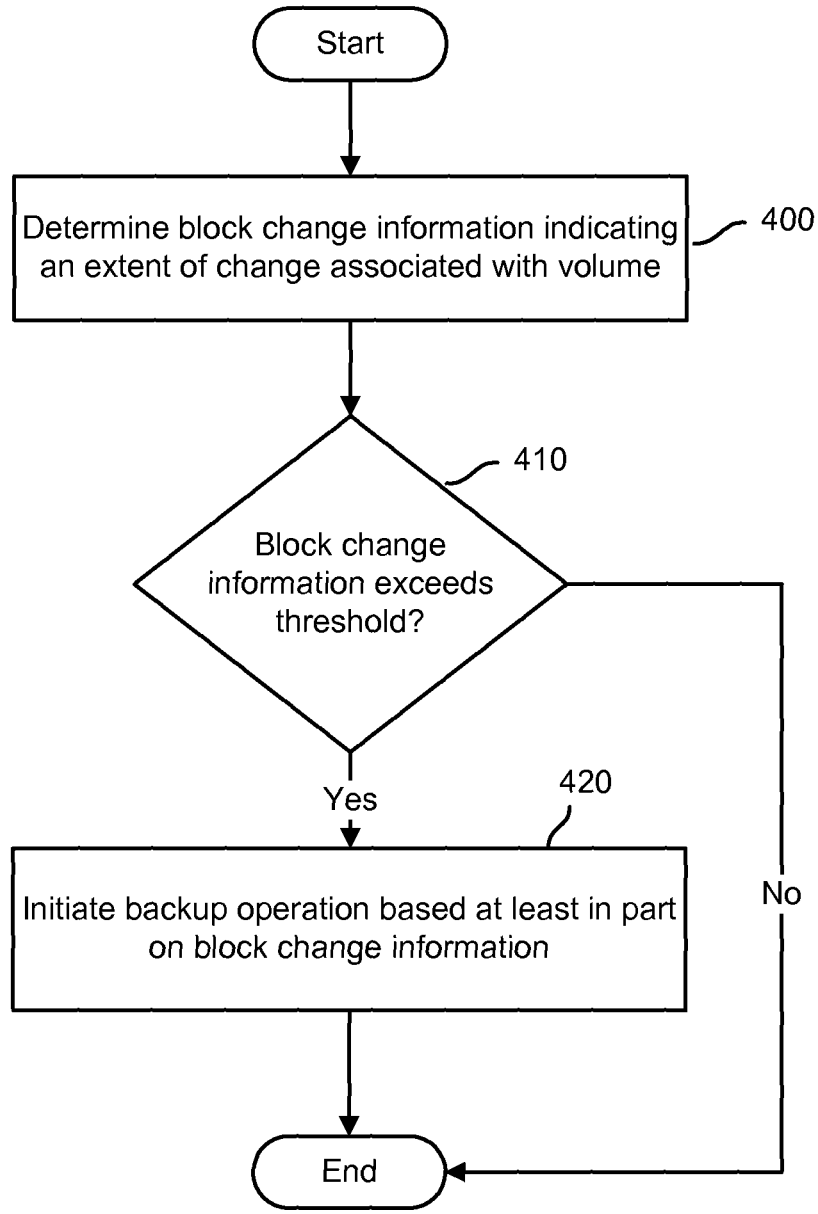
FIG. 4A is a flow chart illustrating an embodiment of a process to protect data using block-based backup.

FIG. 4A is a flow chart illustrating an embodiment of a process to protect data using block-based backup. In some embodiments, the process of FIG. 4 is executed by decision logic 130 and/or backup agent 120 of FIG. 1. At 400, block change information indicating an extent of change associated with a volume may be determined. Block change information may represent (e.g., quantify) an extent to which blocks in a storage volume have changed and/or are changing. In various embodiments, block change information is based at least in part on stored information indicating monitored/tracked changes to blocks in the volume. For example, a CBT engine and/or other component(s) may monitor and store information indicating monitored changes to blocks in a source volume. The information may include, for example, a list of monitored changes to blocks in the volume, times associated with the changes, and/or other information. In some embodiments, the information may include a bitmap representing changes to, locations of, and/or other information associated with blocks on the source volume.

In various embodiments, information indicating monitored changes to blocks in the volume may be retrieved from the CBT engine. For example, decision logic and/or backup agent may periodically and/or continuously (e.g., as defined by the backup settings) retrieve information indicating monitored changes to blocks in the volume from the CBT engine. In some embodiments, information indicating monitored changes to blocks in the volume may be provided (e.g., pushed) from the CBT engine to the decision logic. The information indicating monitored changes to blocks in the volume may be provided to the decision logic periodically, continuously, upon the occurrence of certain events, and/or in another manner as dictated by, for example, backup settings. In various embodiments, the stored information indicating monitored changes to blocks in the volume (e.g., since a last backup) may be processed to determine block change information. For example, information indicating monitored changes to blocks in the volume may include a list of changed blocks and times associated with the changes, and this information may be used to determine a number of blocks that have changed over a period of time (e.g., since a last data protection operation). In another example, the list of changed blocks and times associated with the changes may be used to calculate a percentage of changed blocks relative to a state of the volume at a last backup.

In various embodiments, the block change information may indicate the extent of change as a number of changed blocks, a number of changed blocks over a period of time, a percentage of changed blocks relative to a baseline, a number/percentage of blocks accessed over a period, and/or other value(s). For example, the block change information may indicate a number of blocks in the volume changed since a last backup, restore, and/or other data protection operation. In this case, the block change information may be reset (e.g., set to zero) each time a backup, restore, and/or other data protection operation is performed. In another example, block change information may include a number of blocks changed over a period of time (e.g., an administrator-defined period of time, user-defined period, an automatically-determined period, a period since a last backup, etc.). In another example, the block change information may indicate a percentage of blocks changed relative to a baseline (e.g., a reference state of the volume). A percentage change relative to a baseline may include, for example, a percentage of blocks changed relative to all of the blocks in the volume (e.g., an entire drive), relative to a state of the volume (e.g., a configuration of blocks in the volume at a certain time) at last backup and/or restore, and/or relative to another reference. In another example, In various embodiments, block change information may indicate (e.g., quantify) other events associated with a source volume, client device, backup servers, and/or other nodes. Block change information may indicate a number/percentage of blocks accessed (e.g., but not necessarily changed). For example, the backup agent may retrieve data indicating access to data in the source volume from, for example, the CBT engine and/or other nodes associated with a computing device including the source volume. In another example, block change information may indicate access events associated with a volume (e.g., access associated with blocks in the volume), a rate of access to the volume (e.g., over a period of time), a percentage of the volume access (e.g., a percentage of blocks accessed), and/or other access-related information. In a further example, block change information may indicate a number/percentage of deleted blocks, a number/percentage of damaged/corrupted blocks, and/or other information related to a storage volume.

In some embodiments, the block change information may include a combination of values (e.g., number of blocks changed/accessed, percentage of blocks changed/accessed, etc.). For example, the block change information may include a sum, weighted sum, product, and/or other combination of percentage blocks changed, number of blocks changed, number of blocks changed over a period of time, and/or other values. In another example, the block change information may include a set (e.g., vector) of values, including for example, a number/percentage of changed blocks, number/percentage of accessed blocks, number/percentage of damage blocks, and/or other values.

According to certain embodiments, block change information may include data indicating events associated with the client device (e.g., on which the source volume is installed), backup server, backup target, and/or other node. For example, events associated with client device may include power interruption events, unwarranted attempts to access the source volume, and/or other events that may impact the security of data on the source volume.

At 410, it may be determined whether block change information exceeds a threshold. In various embodiments, the occurrence of a backup-trigger event may occur when the block change information exceeds a threshold. For example, block change information indicating a number of blocks changed over a period may be compared to threshold (e.g., a threshold number of changed blocks). In the event the block change information exceeds the threshold, the process may proceed to step 420 (e.g., where an occurrence of a backup-trigger event may be determined). In the event the block change information does not exceed the threshold, the process may end.

In various embodiments, thresholds (e.g., backup-trigger event thresholds) and/or other information used to determine an occurrence of a backup trigger event may be defined by a user (e.g., received at the backup server, set by an administrator, etc.), automatically determined, and/or otherwise defined. For example, threshold, backup-trigger rules, and/or other information used to determine an occurrence of a backup trigger event may be automatically determined based on prior backup operations. By way of example, multiple prior backup operations may, for example, be analyzed to determine an average number of changed blocks backed up over multiple incremental backups, and this value may be set as a threshold for use in determining an occurrence of backup-trigger events.

In various embodiments, an occurrence of a backup-trigger event may be determined based on the determination that the block change information (e.g., number/percentage of change associated with blocks in the volume) exceeds a threshold, and/or otherwise indicates that a backup operation should be performed.

In some embodiments, different types of backup-trigger events may be detected and/or determined. For example, backup-trigger events may be associated with different levels/amounts of change to blocks in the volume. A first backup-trigger event may be determined to occur when a number/percentage of blocks change exceeds a first threshold. A second backup-trigger event may be determined to occur when a number/percentage of blocks change exceeds a second threshold that is higher (e.g., greater) than the lower threshold. In another example, one backup-trigger event may be associated with a number of changed blocks (e.g., triggered when block change information including a number of changed blocks exceeds a threshold). And another backup-trigger event may be associated with a percentage of changed blocks (e.g., triggered when block change information including a percentage of changed blocks exceeds a threshold). As discussed below, each of multiple types of backup-trigger events may cause different types of backup operations to be performed.

At 420, a backup operation may be initiated based on the block change information. In various embodiments, a backup operation may be initiated by invoking (e.g., commanding) a backup agent to perform an incremental backup, a full backup, and/or backup operation(s) with respect to the source volume. In some embodiments, a type of backup operation may be determined based on user input (e.g., input received at a backup server), backup configuration information (e.g., stored at a backup server), and/or other data. For example, type(s) of backup operations to be performed based on the occurrence of backup-trigger events may be defined by a user (e.g., administrator) at the backup server.

In various embodiments, a type of backup operation may be determined based on the backup-trigger event (e.g., the type of trigger event determined). For example, a first backup-trigger event may be associated with a greater number/percentage change to blocks in a volume (e.g., is associated with a high threshold), and a full backup operation may be initiated upon occurrence of the first backup trigger event. While a second backup-trigger event may be associated with a smaller number/percentage change to blocks in the volume (e.g., associated with a lower threshold), and an incremental backup operation may be initiated upon occurrence of the second backup-trigger event.

Figure 4B:
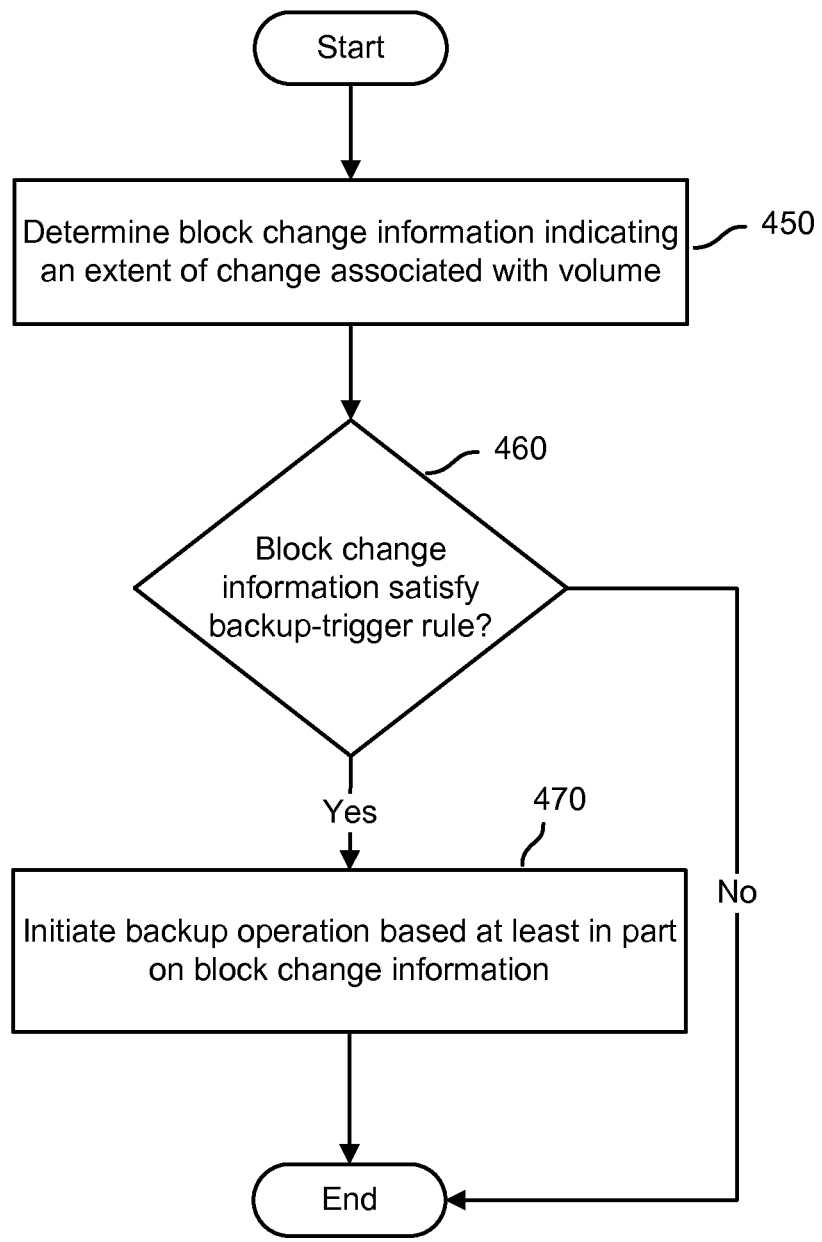
FIG. 4B is a flow chart illustrating an embodiment of a process to protect data using block-based backup.

FIG. 4B is a flow chart illustrating an embodiment of a process to protect data using block-based backup. In some embodiments, the process of FIG. 4 is executed by decision logic 130 and/or backup agent 120 of FIG. 1. In the example shown, the process is similar to that shown in FIG. 4A. At 450, block change information indicating an extent of change associated with a volume may be determined. The block information may be based at least in part on stored information indicating monitored changes to blocks in a volume.

At 460, it may be determined whether the block change information satisfies backup-trigger rule(s). In various embodiments, block change information may be analyzed based on backup-trigger rules. Backup-trigger rules may include combinations of backup-trigger conditions based on, for example, logical operators (e.g., AND, OR, NOR, etc.). A trigger condition may, for example, include a backup trigger threshold, conditions based on events associated with the volume, conditions based on events associated with a client device (e.g., a power interruption, heavy usage indications, unwarranted access attempts, etc.), and/or any other type of condition. For example, a rule may state that if a number of change blocks over a period exceeds a first value OR a percentage of blocks of blocks changed exceeds a second value, an occurrence of a backup-trigger event is determined. In another example, in a conjunctive rule, if a number/percentage of change blocks exceeds a first threshold AND an event associated with the client device (e.g., a power interruption, heavy usage indications, unwarranted access attempts, etc.) occurs, an occurrence of a backup-trigger event may be determined. In the event the block change information satisfies the rule, the process may proceed to step 470. In the event the block change information does not satisfy the rule, the process may end.

In various embodiments, backup-trigger rules and/or other information used to determine an occurrence of a backup trigger event may be defined by a user (e.g., received at the backup server, set by an administrator, etc.), automatically determined, and/or otherwise defined. For example, backup-trigger rules may be generated by analyzing prior backup operations to, for example, determine combinations of thresholds (e.g., a threshold number of changed blocks AND a threshold percentage change) for inclusion in the backup-trigger rules.

At 470, a backup operation may be initiated based on the block change information. In some embodiments, a backup operation may be initiated based on the determination that a backup-trigger event has occurred (e.g., as indicated by satisfaction of a backup-trigger rule). In various embodiments, a backup operation may be initiated by invoking (e.g., commanding) a backup agent to perform an incremental backup, a full backup, and/or backup operation(s) with respect to the source volume.

Figure 5:
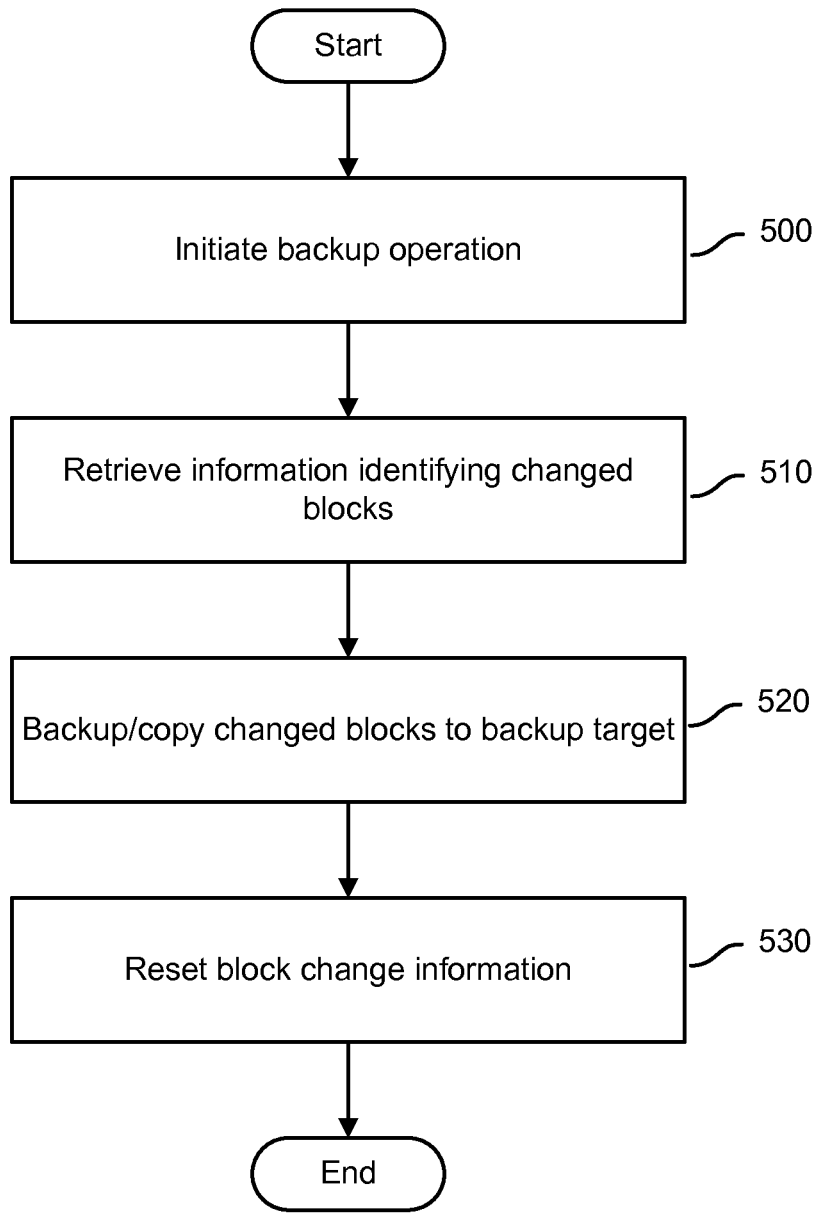
FIG. 5 is a flowchart illustrating an embodiment of a process of incremental backup.

FIG. 5 is a flowchart illustrating an embodiment of a process of incremental backup. At 500, a backup operation may be initiated. In some embodiments, an incremental backup operation may be initiated. The backup operation may be initiated based on the determined occurrence of a backup-trigger event, initiated as a scheduled backup, manually triggered (e.g., based on user input at the client device, backup server, and/or other node), and/or otherwise initiated.

At 510, information identifying blocks that have changed since a previous backup, restore, and/or other data protection operation may be retrieved. The information identifying changed blocks may be retrieved, for example, by a backup agent from a database associated with a CBT engine (e.g., including information indicating monitored changes to blocks in the source volume collected and stored by the CBT engine). The information identifying blocks changed since a previous data protection operation may be retrieved, for example, an information indicating monitored changes to blocks in the volume data structure (e.g., the same data structure used to determine block change information).

At 520, changed blocks may be copied and/or backed up to a backup target. In various embodiments, an incremental backup operation may be performed to copy the identified changed blocks to a backup volume (e.g., at a backup target). In certain cases, the blocks identified as changed blocks may be copied to the backup target, while unchanged blocks may remain on the source volume (e.g., untouched).

At 530, block change information may be reset. In various embodiments, upon completion of a backup operation, information indicating monitored changes to blocks in the volume (e.g., tracked by the CBT driver and/or stored in a CBT database), block change information (e.g., persisted at the decision logic), and/or other information may be reset and/or set to zero. The information indicating monitored changes to blocks in the volume that is stored in the CBT database may be reset in order to save space, improve the speed of future block change determination operations, and/or improve the speed of future backup operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   monitoring block change information, wherein the monitoring of the block change information comprises tracking block-level changes to a first set of one or more blocks in a volume, and storing the block change information, wherein the block change comprises information associated with the block-level changes and one or more access events with respect to a second set of one or more blocks in the volume;
   obtaining the block change information, wherein at least part of the block change information indicates an extent of change associated with the volume, the block change information based at least in part on stored information indicating monitored changes to the first set of the one or more blocks in the volume;
   determining a type of backup operation of a backup operation based at least in part on the block change information; and
   initiating the backup operation based at least in part on the determined type of backup operation and the block change information.

2. The method of claim 1, wherein initiating a backup operation includes:
   determining that the block change information exceeds a threshold value;
   determining an occurrence of a backup-trigger event based at least in part on the determination that the block change information exceeds the threshold; and
   initiating the backup operation based at least in part on the determined occurrence.

3. The method of claim 2, further comprising receiving backup settings including the threshold value.

4. The method of claim 1, wherein initiating a backup operation includes:
   determining that the block change information satisfies a backup-trigger rule;
   determining an occurrence of a backup-trigger event based at least in part on the determination that the rule has been satisfied; and initiating the backup operation based at least in part on the determined occurrence.

5. The method of claim 4, wherein the backup-trigger rule includes a combination of threshold values.

6. The method of claim 4, wherein the backup-trigger rule includes two or more trigger conditions combined using logical operators.

7. The method of claim 1, wherein the extent of change includes a percentage change to blocks in the volume.

8. The method of claim 1, wherein the extent of change includes a number of blocks in the volume changed over a period of time.

9. The method of claim 1, further comprising:
monitoring changes to the first set of the one or more blocks in the volume; and
storing information indicating the monitored changes in a data structure.

10. The method of claim 1, wherein determining block change information comprises:
querying a data structure comprising the information indicating the monitored changes to the first set of one or more blocks in the volume; and
determining the block change information based at least in part on information received at least in part in response to the query.

11. The method of claim 10, wherein querying the data structure comprises:
querying the data structure at predetermined intervals.

12. The method of claim 1, wherein initiating the backup operation includes initiating an incremental backup of the first set of one or more blocks in the volume.

13. The method of claim 1, wherein initiating the backup operation includes:
retrieving information identifying at least one of the first set of one or more blocks changed since a previous backup from a data structure comprising the information indicating the monitored changes to blocks in the volume; and
initiating a backup operation to backup the identified at least one of the first set of one or more blocks.

14. The method of claim 13, further comprising resetting the data structure based at least in part on a completion of the backup operation.

15. A system, comprising:
a processor; and
a memory coupled with the processor, wherein the memory is configured to provide the processor with instructions which when executed cause the processor to:
monitor block change information, wherein to monitor the block change information comprises to track block-level changes to a first set of one or more blocks in a volume, and to store the block change information, wherein the block change comprises information associated with the block-level changes and one or more access events with respect to a second set of one or more blocks in the volume;
obtain the block change information, wherein at least part of the block change information indicates an extent of change associated with the volume, the block change information based at least in part on stored information indicating monitored changes to the first set of the one or more blocks in the volume;
determining a type of backup operation of a backup operation based at least in part on the block change information; and
initiate the backup operation based at least in part on the determined type of backup operation and the block change information.

16. The system recited in claim 15, wherein the instructions to initiate the backup operation include instructions to:
determine that the block change information exceeds a threshold value;
determine an occurrence of a backup-trigger event based at least in part on the determination that the block change information exceeds the threshold; and
initiate the backup operation based at least in part on the determined occurrence.

17. The system recited in claim 15, wherein the instructions to initiate the backup operation include instructions to:
determine that the block change information satisfies a backup-trigger rule;
determine an occurrence of a backup-trigger event based at least in part on the determination that the rule has been satisfied; and
initiate the backup operation based at least in part on the determined occurrence.

18. The system recited in claim 17, wherein the backup-trigger rule includes two or more trigger conditions combined using logical operators.

19. A computer program product, the computer program product being embodied in a tangible non-transitory computer readable storage medium and comprising computer instructions for:
monitor block change information, wherein to monitor the block change information comprises to track block-level changes to a first set of one or more blocks in a volume, and to store the block change information wherein the block change comprises information associated with the block-level changes and one or more access events with respect to a second set of one or more blocks in the volume;
obtain the block change information, wherein at least part of the block change information indicates an extent of change associated with the volume, the block change information based at least in part on stored information indicating monitored changes to the first set of the one or more blocks in the volume;
determine a type of backup operation of a backup operation based at least in part on the block change information; and
initiating the backup operation based at least in part on the determined type of backup operation and the block change information.

20. The computer program product recited in claim 19, further comprising computer instructions for:
determining that the block change information exceeds a threshold value;
determining an occurrence of a backup-trigger event based at least in part on the determination that the block change information exceeds the threshold; and
initiating the backup operation based at least in part on the determined occurrence.

21. The method of claim 1, wherein the initiating the backup operation based at least in part on the determined block change information comprises:
determining that the extent of change exceeds one of a plurality of threshold values based at least in part on the block change information;
in the event that the extent of change is determined to exceed a first threshold value,
determining that a first backup trigger event occurred; and initiating a first backup operation based at least in part on the determined occurrence of the first backup trigger event, wherein the first backup operation is associated with the first backup trigger event and the first threshold value; and in the event that the extent of change is determined to exceed a second threshold value,
- determining that a second backup trigger event occurred; and
- initiating a second backup operation based at least in part on the determined occurrence of the second backup trigger event, wherein the second backup operation is associated with the second backup trigger event and the second threshold value.

22. The method of claim 1, wherein the backup operation is a block-based backup operation.

23. The method of claim 1, wherein the block-level changes are tracked by a change block tracking drive operating on an operating system stack.

24. The method of claim 1, wherein the block change information comprises time information associated with a time at which a corresponding one or more blocks were changed.

25. The method of claim 1, wherein the backup operation includes using a mapping of blocks in the volume with blocks in a backup volume in connection with backing up corresponding data.

26. The method of claim 1, wherein the determining of the type of back up operation of the backup operation based at least in part on the block change information comprises:

determining whether obtained block change information corresponds to a combination of an extent of block-level changes to the first set of the one or more blocks and an extent of access events with respect to the second set of the one or more blocks exceeds a predefined threshold; and determining the type of back up operation based at least in part on whether the combination of the extent of block-level changes to the first set of the one or more blocks and the extent of access events with respect to the second set of the one or more blocks exceeds the predefined threshold.

* * * * *